Feb. 1, 1955          I. J. KRCHMA          2,701,180
PRODUCTION OF TITANIUM TETRACHLORIDE
Filed Oct. 26, 1951
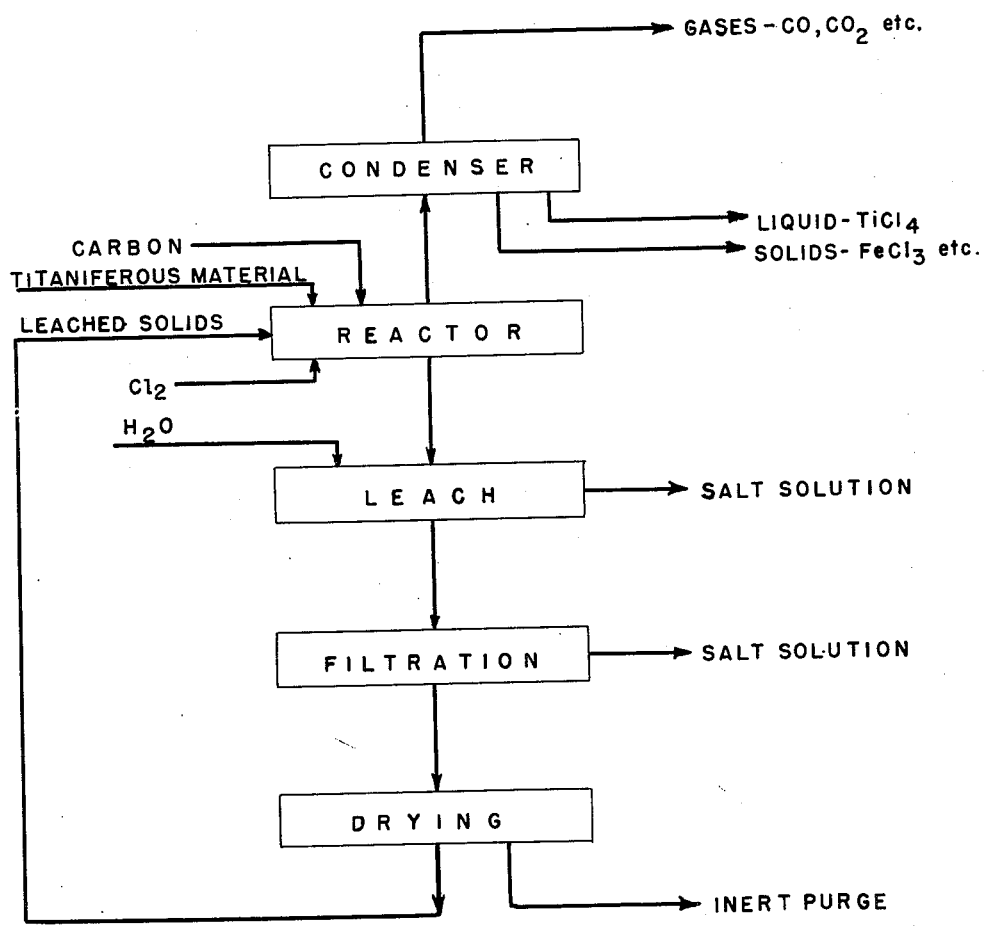
INVENTOR:
IGNACE J. KRCHMA
BY
ATTORNEY.

United States Patent Office 2,701,180
Patented Feb. 1, 1955

2,701,180

PRODUCTION OF TITANIUM TETRACHLORIDE

Ignace Joseph Krchma, Wilmington, Del., assignor to E. I. du Pont de Nemours and Company, Wilmington, Del., a corporation of Delaware Application October 26, 1951, Serial No. 253,384

6 Claims. (Cl. 23—87)

This invention relates to the production of titanium tetrachloride from titanium-bearing materials, and more particularly to the production of a relatively pure form of that product through fluidized bed chlorination of a titaniferous material containing substantial amounts of undesirable impurities, such as alkaline earth and alkali metal compounds.

Titanium tetrachloride can be prepared by chlorinating titanium-bearing minerals such as ilmenite or rutile by a continuous process such as disclosed in U. S. Patent 2,184,887. Thus, the ore, a carbonaceous reducing agent such as carbon, and chlorine are charged into the reactor at such a rate that sufficient heat is evolved to maintain reaction temperatures above 600° C. and preferably from 850° C. to 1250° C. The amount of carbon employed is regulated and is usually maintained during the reaction in the range of from about 15–35% by weight of the ore fed to the system. Continuous operation can be readily effected by feeding the titaniferous ore and coke in finely divided state (approximately 8–200 mesh) into the reaction chamber, while simultaneously feeding pure chlorine or chlorine in admixture with air into the bottom of the reactor so that the unreacted solids are maintained in intimate contact with the gas and suspended in an upwardly flowing stream of said gas to obtain a fluidized (or bubbling bed) condition. The gaseous reaction products, containing chlorides of titanium and iron, are removed from the reactor along with the CO, $CO_2$, unreacted $Cl_2$, and (if air is used) $N_2$. These products are cooled and condensed in a separate system to effect recovery of the desired end product.

The temperature of the reactor in this fluidized bed system is determined by many factors. The heat generated by the reaction will depend on the composition of the ore, i. e., on its iron and titanium content. Generally speaking, the higher the ratio of FeO to $TiO_2$, the lower will be the operating temperature. Also, the rate of reaction will be faster, the finer the condition of the ore and coke, with the use of too fine solids being avoided to prevent their being blown from the reactor. The $TiO_2$ content of the bed should be in considerable excess of the amount of chlorine being passed therethrough, i. e., the amount of chlorine present in the reactor at any moment should be sufficient to maintain the reaction, but an excess of $Cl_2$ over Fe can also be maintained when formation of ferric chloride is desired. With lesser amounts of chlorine, ferrous chloride of lower volatility results. The total gas flow within the reactor should be maintained within the range of .1 to 1.5 ft. per second to provide the flow necessary for suspension of the reactant solid particles in the fluidized bed, which flow can be readily adapted to the particle size distribution within the reaction chamber. With careful regulation of these factors a relatively high yield (90–95%) of $TiCl_4$ and $FeCl_3$ can be maintained for indefinite periods with very little loss of excess chlorine. As the titaniferous ores and coke usually contain some impurities such as aluminum silicate, $SiO_2$, etc. which are largely unreactive at the optimum temperatures of operation (800–900° C.), the unreactive impurities build up but can be suitably eliminated by removing, continuously or intermittently, a portion of the reaction bed when the total inert content of said bed reaches 25–50%. Because of the corrosive effect of the reactants and reaction products the reactor bed temperatures are kept as low as possible, consistent with high yields, e. g., should be held below a temperature of 900° C. when the composition of the feed material is that of a normal ilmenite concentrate containing, say, 60% $TiO_2$ and 35% oxides of iron.

The foregoing method of making $TiCl_4$ presents certain obvious limitations when it is considered that certain titaniferous materials do not lend themselves to this type of processing. These comprise materials containing substantial amounts of impurities such as alkaline earth or alkali metal compounds which react with chlorine to form salts occurring in the molten state at the furnacing temperatures used and which, disadvantageously, coat the particles present in the reactor bed to thereby destroy the efficiency of the reaction. The presence of substantial amounts of these salts results in the prevalence of sticky condition of reactants and in many instances actual plugging of the reactor by completely cementing together the reactor bed particles. Under such conditions a fluidized bed chlorination operation is rendered inoperative. Recourse to static and non-continuous methods of chlorination with such materials is undesirable due to their difficult and costly nature because of the necessity of removing from the furnace the very hard cemented material which forms therein. A cementing, coating, or plugging effect can also result from $FeCl_2$, but because of its relatively low boiling point (compared to alkaline earth or alkali metal chlorides) and its adequate vapor pressure, does not normally affect the efficient operation of the fluidized bed chlorination of titaniferous ores. By either continuously maintaining an excess of chlorine or operating at a temperature where all $FeCl_2$ is volatile, the cementation by $FeCl_2$ is to a large degree avoided. Also, it is known that $FeCl_2$ and $FeCl_3$ vaporize with the titanium tetrachloride and can be separated therefrom in known condensing systems.

It is among the objects of this invention to produce titanium tetrachloride from certain impurity-bearing titanium materials by a continuous type of chlorination, and by means of fluidized bed reaction technique. A further object is to obtain titanium tetrachloride by means of such reaction and by the chlorination of titanium-bearing materials containing substantial amounts of impurities which convert to molten chlorides with boiling points above the furnace temperature required in the chlorination. A specific object is to produce titanium tetrachloride by means of a fluidized bed reaction in which chlorination is effected of a titaniferous slag product containing substantial amounts of alkaline earth and/or alkali metal compounds which have been added to the titaniferous ore from whence said slag is obtained. Further objects and advantages of the invention will be evident from the ensuing description and accompanying drawing which is illustrative of one form of process for carrying out the invention.

These and other objects are realized in this invention which comprises obtaining $TiCl_4$ from a titaniferous material containing objectionable compounds which form molten salts during the chlorination, by effecting said chlorination by fluidized bed technique while maintaining tthe reaction bed in fluidized state by adding the chlorine reagent gas at the bottom of the reactor while simultaneously adding said titaniferous material in finely divided condition and a carbonaceous material thereto, during said chlorination withdrawing a portion of the fluidized solids and subjecting them to aqueous leaching treatment to remove soluble chloride salts therefrom, drying and returning the solids recovered from said leaching to the reaction chamber, and recovering the $TiCl_4$ from the gaseous reaction products from the chlorination.

The invention is particularly adaptable to the treatment of titaniferous oxidic slag compositions such as are disclosed in U. S. Patent 2,476,453 and which result from electric furnace smelting of a titaniferous ore such as ilmenite to obtain iron values therefrom. While the $TiO_2$ content of the initial ore may range from 30–40% and the total Fe content 30–50% in the oxidic slag removed during the electric furnace operation, the $TiO_2$ content increases to become the major oxide component, or to about 60–80%, while the total iron is reduced to 10%–20%. This constitutes a considerable improvement in the economics of the chlorination process because less chlorine is used to produce iron chloride as a by-product, and furthermore iron production from titanium-bearing ore becomes more feasible since this process provides a large commercial use for the titanium-bearing slag material. However, and as already noted, addition of the slagging materials at the electric furnace renders difficult the use of oxidic slags in a fluidized chlorination system. Without my invention, these slags have proved inoperable for use without first substantially altering the characteristics of this source of titanium. Slagging materials added include such usual components as calcium, magnesium and sodium compounds, as well as other members of the alkali metal and alkaline earth metal groups. (Magnesium is considered a member of the alkaline earth group.) These materials convert to chlorides which melt between 500° C. and 1250° C., the range used in the fluidized bed chlorination. The amounts usually present in such slags are CaO about .1–10%; MgO about 1–10%, etc. These chlorides are also characterized by low volatility at temperatures used in the chlorination.

For example, a ground slag material obtained from the smelting of a titaniferous iron ore bed had the following composition:

|  | Per cent |
| --- | --- |
| $TiO_2$ | 72 |
| FeO | 8 |
| CaO | 9 |
| MgO | 4.5 |
| Other | 6.5 | and was fed continuously with carbon (weight ratio of 3 parts slag to 1 part carbon) into a tubular furnace equipped for introduction of chlorine gas at the bottom, and provided with an exit at the top for passing product gases into a condenser to effect separate condensing of the $TiCl_4$ and $FeCl_3$ products. After 30 minutes' operation, while holding the temperature at 900° C. the entire reaction bed set up as a hard mass in the furnace, causing it to become completely plugged and stopping the chlorination reaction. A very low yield of $TiCl_4$ was obtained.

The effectiveness and improved character of my invention is demonstrated by a comparable operation in which the same type of titaniferous slag is rendered operatively useful by continuously removing a portion of the fluidized bed during the chlorination reaction, subjecting it to leaching until substantially free of soluble chlorides, and then returning the chloride-free solids to the furnace. Since the chlorination rate of the CaO and MgO contained in the slag is about equal to or higher (see Table I) than $TiO_2$, a large portion of these components fed to the reactor chlorinate very rapidly. By removing a portion of the bed continuously, leaching to remove the soluble chlorides, drying, and reheating the returned bed to maintain temperature of reaction, the instantaneous soluble chloride content of the bed can be maintained at about 4–7% or even less, at which concentration no difficulty is experienced by reason of the bed sticking together or furnace plugging resulting therefrom. For this specific slag the recirculation rate, based on $TiO_2$, is three times the normal feed rate maintained to hold to a soluble chloride content of the bed within the desired range, and as will be discussed later.

TABLE I

*Relative chlorination rates of slag metal components at 850° C.*

| $TiO_2$ | FeO | CaO | MgO | $Al_2O_3.SiO_2$ |
| --- | --- | --- | --- | --- |
| 64 | 90 | 88 | 62 | very low |

It is pointed out, however, that the recirculation rate required will depend upon the actual alkali and alkaline earth components of the slag or ore, and rate of return may be varied over wide limits. Because of economic considerations, it is preferred to preform the process so that a recirculation rate not more than 5 times the fresh feed rate ($TiO_2$ basis) is maintained.

The accompanying schematic drawing comprises a flow sheet of an embodiment of the invention for the production of $TiCl_4$ from titaniferous slag materials. In such embodiment a finely divided, ground titaniferous slag material of the type above referred to is continuously charged into a reactor for reaction simultaneously therein in the form of a fluidized bed with carbon and chlorine, the products of reaction being withdrawn therefrom for condensation and recovery in a suitable associated equipment. During the reaction a portion of the fluidized bed solids is continuously or intermittently withdrawn from the reactor, subjected to leaching with water to remove soluble chlorides, particularly calcium and magnesium salts, filtered and then dried, the dried purified solids recovered being recycled, as shown, to the reactor to form a part of the titaniferous feed material being charged thereto.

To a clearer understanding of the invention, the following specific examples are given. These are merely in illustration but not in limitation of the invention:

EXAMPLE I

A production rate of 238# per hour of $TiCl_4$ was maintained by the interaction of a titaniferous slag with carbon and chlorine in a brick-lined chlorination furnace 2.0 ft. in diameter, and 12 ft. high, equipped with chlorine feed inlets in its bottom, an exit for product gases on its top, and means for feeding finely divided granular solid material at the 3 ft. level through an inlet on its side wall, together with means for removing any desired portion of the finely divided granular solid furnace bed from a side wall outlet close to the bottom of the furnace.

The raw feed material fed to the furnace consisted of a ground slag material having the following composition:

|  | Per cent |
| --- | --- |
| $TiO_2$ | 72.0 |
| FeO | 8.0 |
| CaO | 9.0 |
| MgO | 4.5 |
| Inert (incl. $Al_2O_3$ and $SiO_2$) | 6.5 |

This material was obtained as a by-product from the smelting of Canadian titaniferous iron ore in the presence of slagging materials such as limestone and dolomite added thereto to control the flow properties of the molten slag.

The particle size distribution of the ground slag material analyzed by screening was as follows:

|  | Per cent |
| --- | --- |
| −20+35 mesh | 1 |
| −35+65 | 21 |
| −65+100 | 60 |
| −100 | 18 | and was added to the furnace at a rate of 143#/hr. The coke (98% carbon) used was dried and ground to 90% thru 20 mesh and contained a very small amount of ash which, however, did not increase to any significant extent the relative amounts of inert, calcium oxide and magnesia entering the reactor. The coke reactant was fed to the furnace at a rate of 60# per hour.

The furnace bed was maintained in a fluidized condition at 850–900° C. by continually feeding chlorine therein for upward flow therethrough, such rate of introduction being used that the gas velocity in the bed was about .38 foot per second, or 230# chlorine per hour. This was enough chlorine to react with all the $TiO_2$, FeO, CaO and MgO being fed in as raw feed, with a slight excess to insure the conversion of all FeO to $FeCl_3$. The latter was removed from the furnace in the gaseous product which contained $TiCl_4$, $FeCl_3$, CO, $CO_2$ and a small amount of chlorine.

In order to control the bed, i. e., to maintain it in a fluidized condition, control of the amount of bed drawn off and recirculated thru the leaching process was necessary. A furnace bed withdrawal at a rate of 3 pounds of $TiO_2$ per pound of $TiO_2$ in the feed was maintained in order to keep the bed condition completely fluid and in an operable condition.

A lower recirculation rate would be desirable for economic reasons but because of stickiness in the bed and lower efficiency of chlorination could not be maintained. The furnace bed material which was removed from the furnace was cooled, leached with water in a series of counter-current washings to remove water-soluble cementing materials consisting largely of Ca and Mg chlorides, leaving very minor amounts in the leached slag (.02–.1%).

The granular, finely divided, leached slag and coke mixture was dewatered, and dried in a rotary kiln drier, and subsequently fed back to the chlorination furnace along with the raw solid feed and coke. The $FeCl_3$ was separated from the $TiCl_4$ in a conventional cooling and condensing system, using a tubular cooler to lower the temperature of the product gases to such a point that spray cooling (vaporization of liquid $TiCl_4$) would condense a substantial amount of the $FeCl_3$ from the gaseous products as solid. Subsequently, the $TiCl_4$ was condensed by further cooling while allowing non-condensable gases to exhaust to the atmosphere upon passage through an aqueous absorption tower which takes up excess chlorine, and residual uncondensed chloride vapors. The recovered $TiCl_4$ product was particularly useful as an intermediate in the production of metallic titanium, $TiO_2$ pigments, titanium organic compounds, and the like.

EXAMPLE II $TiCl_4$ at a rate of 238 pounds per hour was produced by the chlorination of slag of the following compositions:

| | Per cent |
|---|---|
| $TiO_2$ | 58.7 |
| FeO | 20.5 |
| CaO | 3.1 |
| MgO | 5.9 |
| $SiO_2$, etc | 11.8 | in a fluidized reactor such as described in Example I. The slag was fed to the reactor at a rate of 174 pounds per hour with the coke feed rate at 60 pounds per hour as before. The fineness of the two solid reagents was substantially the same as in the above example. The bed was maintained in a fluidized condition at 800–840° C. for a prolonged period (over one hundred hours) by adding chlorine at a rate of 260#/hr. A portion of the bed was withdrawn at a rate of 182 lbs. of $TiO_2$ per hour, was partially cooled and dropped into a tank equipped with a rake type agitator. 528# of water an hour were fed into the tank which was allowed to overflow continuously. The washed and leached solid material containing .04% soluble chlorides was recovered as a slurry through the bottom of the tank, dewatered, and fed to a continuous kiln type dryer, which removed the moisture, there being only 0.1% $H_2O$ in the discharge. This dried and leached fluidized bed was returned to the furnace without being allowed to cool substantially. Additional coke was added when necessary to make up for any extreme fines lost in the leaching process. Further control of the furnace temperature was effected by adding air with the chlorine to create more heat needed because of the heavy load of solids being returned.

The production of titanium tetrachloride from commercially prepared titaniferous slag is illustrated in the above examples and with a substantial variation in the titanium content of the slag. Such material is expected to be made in large quantities from low-grade titaniferous ores as are to be found in the eastern Quebec section in Canada and the composition thereof may vary considerably depending upon the type of ore and the furnace operating conditions employed. The combined content of magnesium and calcium oxides is greater in the slag used in Example I than in Example II and this required a heavier circulating load than was specified for the higher iron content slag of Example II. It is obvious that one should not withdraw the furnace bed for leaching at a more rapid rate than is necessary to maintain the fluidized condition in the chlorination furnace due to the cost involved in leaching and drying the product for return to the furnace. I have found that the soluble chloride salts of the bed material should be held at an amount not exceeding about 7% of the total bed load and preferably less than about 5% so as to avoid all possibility of material adhering to the walls of the chamber. Since it is undesirable to unnecessarily leach the bed material and recycle the same to the furnace, I find it convenient to maintain the soluble salt content within the range of 4–7%.

In resorting to the contemplated leaching to overcome objectionable sintering in chlorinating particular forms of titaniferous materials, the relative amount of the bed material which must be removed, purified, and recycled, or, to express it differently, the relative proportion of the feed to the chlorinator which must comprise leached and recirculated material, is variable and will depend upon the type of ore or slag employed as raw material. Where there is only a very small quantity of these impurities present, only a limited leaching will be necessary to maintain the content of the entire bed below that at which the sintering will occur. For instance with slags containing less than 2% by weight of the oxides of barium, calcium, strontium, or magnesium, one may recycle from 0.2 to 1.0 part of the leached bed material per part of slag being added to the furnace. As the alkaline earth content increases this weight ratio must also increase, for instance, 1.8 parts as shown in Example II and 3 parts as shown in Example I and the feed may comprise as much as about 7 parts by weight of recycled material per part of new material.

Similarly, any conventional type method of leaching can be employed in the process to remove the alkaline earth halides from the portion of the bed bled from the main chamber. Thus, a simple water leach is ordinarily sufficient for most practical purposes since the chlorides are generally highly soluble therein; if desired, however, resort can be had to other aqueous media such as a mild acid leach or the like. If desired, the leach filtrate can be processed to recover valuable soluble salts present therein.

In the fluidized bed chlorination operation it is obvious that the bed load of the furnace can be varied by the rate of addition of chlorine to the chamber and by adjusting the solids feed to provide a suitable amount of fluidized solids in the reaction chamber. I find it desirable to operate with a substantial bed load and the alkali and alkaline earth chlorides produced will be well distributed over the whole of the bed material. In Example I, I have specified the removal of 3 lbs. of bed material for each pound of original feed but in Example II a lesser recirculation is recorded due to the fact that the slag is lower in alkaline earth oxides and at the same time higher in iron oxide. The latter forms a volatile chloride and does not need to be considered in selecting a proper rate of bed removal for maintaining the proper fluidized condition. With the highest alkali and alkaline earth metal content slags, it is expected that this rate of withdrawal may vary from 3 to 5 lbs. per pound of slag feed material to the reaction chamber.

The temperature conditions used in my improved process may vary from 500–1250° C. and will usually be within the range of 800–1100° C., the latter being the optimum range for a satisfactory rate of production of the desired titanium tetrachloride and a low maintenance cost on the equipment which becomes substantial at excessive temperatures. The desired reaction temperature is usually maintained by the heat of reaction, it being adequate when large quantities of diluting gases, e. g., nitrogen and air, are avoided and where the reaction chamber or furnace has a high volume/surface ratio. Preheating of the reactants may be desirable but such expediencies are considered well known in the art and the selection of the conditions for obtaining a desired reaction temperature is not considered a part of my invention. Any of a number of heat addition and heat extraction methods may be employed by those skilled in the art.

As noted, the slag products particularly contemplated for use in accordance with the invention comprise those obtained from the electric smelting of titaniferous iron ores for the recovery of iron therefrom. U. S. Patent 2,476,453 discloses their production and composition. These products analyze from 60–85% $TiO_2$ with the remainder being oxides of magnesium, calcium, iron, silicon, aluminum, sodium, etc. While these compositions are especially contemplated for use, it is understood that titanium ores containing substantial amounts of calcium, magnesium, sodium, and the like, forming chlorides melting at from 500–1250° C. can also be converted to titanium tetrachloride by my novel method. Thus, treatment and use is contemplated of titaniferous ores containing substantial amounts of alkali and alkaline earth materials having chloride melting points in the indicated temperature range and having boiling points generally above that range. Obviously, the process is also applicable to titanium-bearing ores other than ilmenite containing substantial amounts of calcium, magnesium, sodium, potassium, and the like. Such naturally occurring titaniferous ores include sphene or titanite and perovskite.

A solid reducing agent is suitable and preferable for use in the process and comprises carbon in the form of coke. Pure chlorine is quite satisfactory for use but recovered chlorine containing substantial amounts of oxygen and nitrogen is also useful and gives good yields of titanium tetrachloride. The more dilute the chlorine, the lower will be the reaction temperature for any given conditions, and for this reason a chlorine feed material analyzing from 70–100% chlorine is desirable. However, chlorine which results from the oxidation of titanium tetrachloride in the production of pigment may be used even though it runs only about 30% chlorine.

I claim as my invention:

1. A continuous process for the preparation of titanium tetrachloride from a titaniferous slag material containing impurity alkaline earth compounds which comprises reacting at elevated temperature a fluidized solids bed of said titaniferous material in finely divided condition and a carbonaceous reducing agent with gaseous chlorine, separately recovering and condensing the titanium chloride vapors thus formed, and during the reaction maintaining in the fluidized solids bed an amount of soluble chloride of said impurity of from about 4–7% by weight of the total bed by continuously removing a sufficient portion of said solids bed from the reaction zone, subjecting said portion to leaching in an aqueous medium to remove soluble alkaline earth metal salts, drying the leached product to form a solid residue, and continuously recirculating the dried solid residue recovered from said leaching treatment to the reaction zone.

2. A continuous process for producing titanium tetrachloride from titaniferous titanium slag material containing alkaline earth metal compounds as impurities, which comprises adding said slag and coke to a heated reaction zone for reaction therein in fluidized state with chlorine, maintaining said fluidized condition by adding the chlorine into said zone for upward flow therethrough and during the reaction removing molten water-soluble salts melting between 500° C. and 1250° C. from the fluidized bed material to maintain the content of said water-soluble salts in said bed within a range of from about 4–7% by weight by withdrawing a portion of the fluidized solids from said bed and zone, water-leaching the solids thus removed, drying the leached product to form dried purified solids, returning said dried, purified solids from said leaching step to the reaction zone, employing in said returning operation from .2 to 7 parts by weight of leached bed material per part of slag being fed to the reaction zone and recovering the titanium tetrachloride from the gaseous chlorination product.

3. A continuous process for the production of titanium tetrachloride from an oxidic slag the major component of which is titanium oxide in association with alkaline earth metal and iron oxides which comprises charging said slag and coke in finely divided state to a reaction zone maintained at a temperature ranging from about 850–1250° C., maintaining said solid reagents in fluidized condition in said zone by upwardly flowing gaseous chlorine therethrough, during the resulting chlorination maintaining the alkaline earth chloride salts content of the fluidized solid reagents in said zone within a range of 4–7% by weight of the total reagents present in said zone by bleeding a portion of the fluidized solids from said zone and subjecting them to a water-leaching operation to remove therefrom alkaline earth chloride salts, drying and returning the leached, chloride-salt-free solids to the reaction zone, together with fresh titaniferous slag material, employing in said returning step from about .2–3 parts by weight of leached solids per part of slag material and recovering the titanium tetrachloride from the gaseous chlorination products.

4. A continuous process for the production of titanium tetrachloride from an oxidic slag product analyzing 60–80% $TiO_2$ and containing an alkaline earth oxide and iron oxide, comprising introducing said slag product and coke into a reaction zone maintained at a temperature of from 850–1250° C., maintaining the solid reagents in said zone in fluidized condition by upwardly flowing a gaseous chlorinating agent therethrough, and throughout the reaction removing the alkaline earth chloride salt from a portion of said fluidized solids to maintain the alkaline earth chloride salt content of the fluidized material within a range of about 4–7% by weight of the total fluidized reactants by withdrawing a sufficient portion of said reactants from said reaction zone, subjecting them to leaching with water, thereafter drying the leached product, returning the dried product, together with fresh titaniferous slag material, to said zone, employing in said returning step from about .2–3 parts by weight of said dried product per part of slag material, and recovering the titanium tetrachloride from the gaseous chlorination products.

5. A continuous process for preparing titanium tetrachloride by chlorinating a titaniferous slag material containing substantial amounts of alkali and alkaline earth metal compound impurities yielding substantial amounts of molten soluble chloride salts of low volatility at the temperatures of chlorination, comprising reacting said slag material at an elevated temperature in a reaction zone in finely divided condition and as a fluidized solids bed suspension with a gaseous chlorinating agent in the presence of a carbonaceous reducing agent, during the reaction maintaining in said bed an amount of soluble alkali and alkaline earth metal chloride salts not exceeding 7% by weight of the total bed by withdrawing a substantial portion of the fluidized, suspended solids containing said salts and subjecting said removed portion to leaching in an aqueous medium to remove its soluble chloride salts content, drying the leached product to form a solid, chloride-freed residue, returning said residue to said reaction zone, and removing the titanium tetrachloride product from the gaseous chlorination products formed in the reaction.

6. A continuous process for the production of titanium tetrachloride from a titanium slag product containing an alkaline earth compound impurity yielding substantial amounts of molten soluble chloride salts of low volatility during the chlorination of said slag, comprising adding said slag product and a carbonaceous reducing agent to a reaction zone maintained at a temperature ranging from 500–1250° C., maintaining the thus-added solid reagents in fluidized condition in said zone by upward flow of a gaseous chlorinating reagent therethrough, during the resulting reaction maintaining an alkaline earth chloride salts content of not to exceed 7% by weight of the total fluidized solids in said zone by withdrawing a substantial portion of the fluidized solids containing said salts from said zone, subjecting the portion so removed to leaching in an aqueous medium to remove its chloride salts content, drying the leached product to form a solid, chloride-freed residue, recycling said residue together with fresh titaniferous slag material in an amount ranging from .2 to 7 parts by weight of said chloride-freed residue per part of titaniferous slag material, and recovering the titanium tetrachloride from the gaseous chlorination products formed in the reaction.

References Cited in the file of this patent

UNITED STATES PATENTS

| Number | Name | Date |
|---|---|---|
| 2,088,913 | Llewellyn | Aug. 3, 1937 |
| 2,378,675 | Agnew | June 19, 1945 |
| 2,527,257 | Judd | Oct. 24, 1950 |
| 2,533,021 | Krchma | Dec. 5, 1950 |
| 2,555,373 | Rowe et al. | June 5, 1951 |